United States Patent [19]

Oades

[11] 4,041,389
[45] Aug. 9, 1977

[54] NONFREQUENCY-CONVERTING MICROWAVE RADIO REPEATER USING A LOW POWER CONSUMPTION AMPLIFIER

[75] Inventor: John Willson Oades, Redwood City, Calif.

[73] Assignee: GTE Automatic Electric Laboratories Incorporated, Northlake, Ill.

[21] Appl. No.: 594,419

[22] Filed: July 9, 1975

[51] Int. Cl.² ............................................. H04B 1/60
[52] U.S. Cl. ................................. 325/3; 179/170 HF; 325/8; 343/176
[58] Field of Search ................................ 325/3, 5, 8; 179/170 HF, 170 NC, 170 D; 333/1.1; 343/176, 181, 175

[56] References Cited

U.S. PATENT DOCUMENTS 2,039,202   4/1936   Vos ............................ 179/170 D
2,875,283   2/1959   Maione ...................... 179/170 D

FOREIGN PATENT DOCUMENTS 394,183   6/1933   United Kingdom .................... 325/5

Primary Examiner—Thomas B. Habecker
Attorney, Agent, or Firm—Leonard R. Cool; Russell A. Cannon

[57] ABSTRACT

A novel nonfrequency-converting microwave radio repeater for use in multichannel telecommunications is disclosed. A single microwave amplifier provides the requisite gain for two different angle-modulated radio frequency signals. Bandpass filters and circulators permit duplex operation by channeling the received signals through the repeater. The two radio frequency signals are amplified simultaneously in the same amplifier and then separated to be retransmitted at the same frequency in the proper path direction.

15 Claims, 3 Drawing Figures

NONFREQUENCY-CONVERTING MICROWAVE RADIO REPEATER USING A LOW POWER CONSUMPTION AMPLIFIER

BACKGROUND OF THE INVENTION

This invention relates to microwave radio repeaters for telecommunications, and more specifically to an inexpensive nonfrequency-converting radio repeater system having very low power requirements.

Microwave radio repeater systems are used to amplify and redirect the RF carriers where the distance between radio terminals is extreme and where geographical and manmade obstacles block the line-of-sight transmission path. Generally, microwave repeaters may be classified as either active or passive. The more common type of passive repeater is the flat "billboard" type metal reflector which acts as a simple microwave mirror. The passive repeater is very useful, where the topography permits, and where it is suitable in other respects for the particular system application. The principal reasons for using a passive repeater are that it provides a fixed signal gain, it is very reliable, and it requires virtually no maintenance. Thus, it can be used on short microwave hops which are inaccessible or too expensive for the typical active repeater. However, for a variety of reasons (cost being the biggest factor), certain applications of passive repeaters are even more impractical than active repeaters both to install and operate. In frequency-congested areas, billboard reflectors can cause interference with adjacent systems since a billboard reflects all electromagnetic energy independent of the source. Furthermore, passive repeaters cannot be used effectively, for reasons of low RF gain, in the 2 GHz band or below or where the included angle exceeds 140°.

Currently, the active repeaters in most radio relay systems are either of the demodulating-remodulating ∓baseband" type or the IF or RF heterodyne type. In each case, the individual information-carrying channels are amplified and otherwise processed at frequencies usually lower than the microwave carrier frequency. For such active repeaters, the overall costs can be prohibitive for inaccessible repeater locations. Aside from the initial radio equipment cost, access roads for routine maintenance must be built and maintained, utility power lines or local power generators must be installed, and repeater housings also constructed. The invention disclosed herein offers an economical and reliable alternative to the traditional active microwave repeater for applications in remote locations where passive repeaters might otherwise be used.

An inexpensive microwave radio repeater providing 25 to 50 dB of gain (not including antenna gain) and capable of being powered from solar cells and/or primary cells could offer a very practical alternative to the passive repeater in the application described above. Since solar cells are low-voltage devices and are capable of supplying only very little power, a radio repeater powered from such cells must be extremely uncomplicated and have very low power requirement. A nonfrequency-converting radio repeater using a single stage of amplification can fulfill all these requirements.

Nonfrequency-converting duplex (bidirectional) repeaters, similar in configuration to the type used herein, have been used commercially for years in the communication industry on submarine cable systems and on CATV cable systems. See "System Considerations in the Design of a Two-Way Transmission System", by H. B. Marron and A. W. Barnhart in the 19th Annual NCTA Convention Transcript 1970, pp. 547– 571. For reasons of poor amplifier and high echo distortion, such repeaters have been limited to cable TV systems and low frequency communication systems. A recent discussion of a single channel, nonfrequency-converting duplex repeater in the VHF/UHF band (225 MHz to 468 MHz) may be found in "Short-Hop Radio-Relay Systems Using Tunnel-Diode Repeaters" by D. L. Hedderly et al., Proceedings IEE, vol. 114, April 1967, pp. 435 – 442. This experimental system for use on electrical transmission high-voltage towers used tunnel diode amplifiers and yagi aerials with curtain reflectors, both of which are very impractical for high-quality reliable microwave radio telecommunication operation of the type discussed herein.

A multichannel nonfrequency-converting repeater has never been used on a commercial basis for microwave radio communications in the common carrier bands above 1.7 GHz. The reason for this is that the many technical problems involved have been thought to be insurmountable. A high-level echo having a long time delay resulting from transmitting and receiving on the same carrier frequency can cause severe echo distortion in the radio baseband. And, this is true independent of the form of carrier modulation used. The invention herein minimizes the echo distortion to acceptable levels, making the nonfrequency-converting repeater a practical concept. Also, by using a reliable repeater design having absolute minimum power requirements, the entire repeater can be used in remote locations without the necessity of locally generated utility-supplied AC power.

SUMMARY OF INVENTION

The present invention advances the current state of the art by disclosing a nonfrequency-converting microwave radio repeater for use in commercial multichannel telecommunictions. The only active component in the repeater is a single microwave amplifier having a low current drain which permits the entire repeater to be powered from solar cells and/or primary cells. Functionally, the duplex repeater provides from 60 to over 110 dB of gain to the two microwave angle-modulated carrier signals ($F_1$ and $F_2$). The two carriers travelling in opposite directions are channeled through the single microwave amplifier by bandpass filters. Once amplified, the signals are separated with two more bandpass filters. Circulators are similarly used in the preferred embodiment to also combine and separate the two directions of transmission, reducing the need for extreme out-of-band filter rejection. High-performance antennas complete the RF link to a coordinating terminal or other repeater.

BRIEF DESCRIPTION OF THE DRAWINGS

The principles of this invention will be best understood by reference to the detailed description of the invention in conjunction with the drawings.

DESCRIPTION OF THE PREFERRED EMBODIMENT

Figure 1:
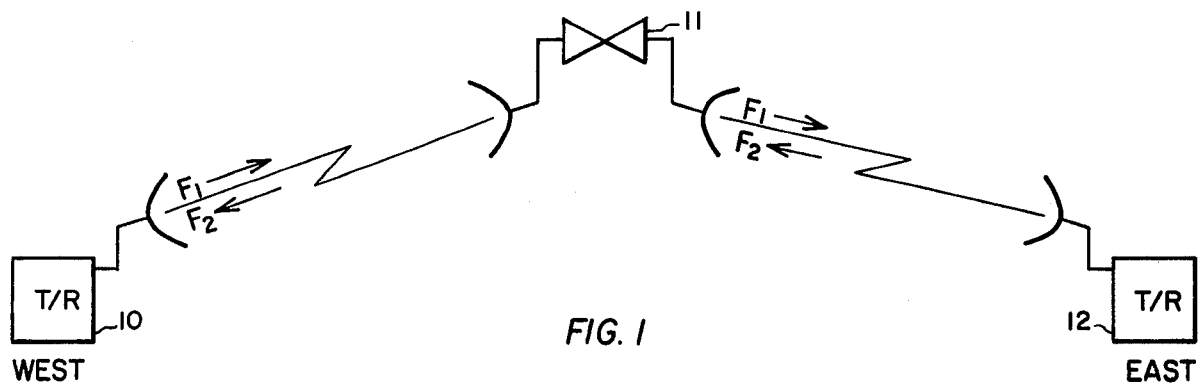
FIG. 1 illustrates a two-hop microwave telecommunication system employing a single repeater of the type discussed herein.

The microwave radio repeater described herein would typically be used on a two-hop microwave system or on most multihop systems. The only restriction is that the path length to and from the particular repeater discussed herein should be limited so as to avoid excessive path loss. The basic two-hop application of this repeater is as shown in FIG. 1. The nonfrequency-converting repeater 11 transmits and receives to and from the west terminal 10 over the same two frequencies that are used for transmission and reception to and from the east terminal 12. For example, the $F_1$ west-to-east RF carrier would be 2.10 GHz and the $F_2$ east-to-west RF carrier would be 2.15 GHz. Such a system configuration is designed for use with the "high-low" or CCIR type frequency plans which divide the frequency bands into equal halves.

Figure 2:
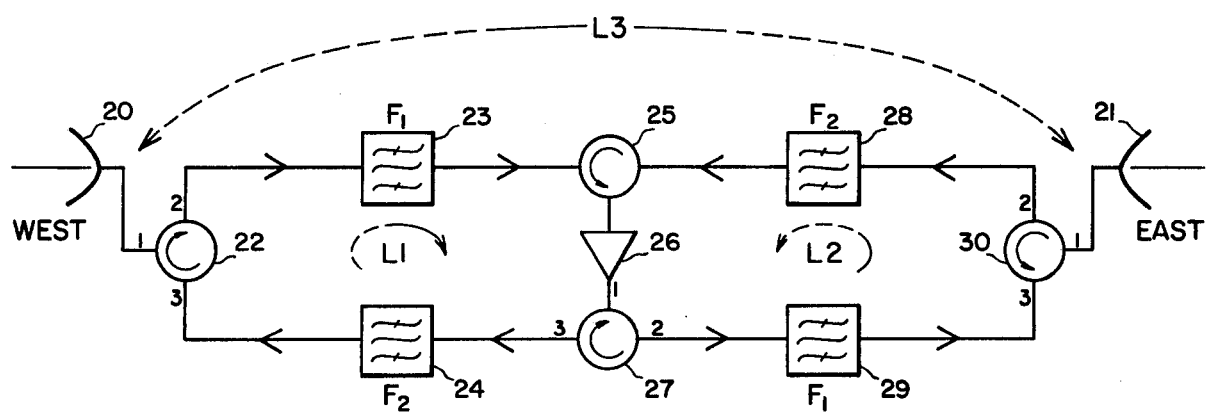
FIG. 2 is a block diagram illustrating one embodiment of this invention.

The preferred configuration of the radio repeater for narrowband operation is shown diagrammatically in FIG. 2. The basic concept of this configuration is to combine the west-to-east carrier signal, $F_1$, and the east-to-west carrier signal, $F_2$, at the input to microwave amplifier 26. The amplifier then simultaneously amplifies the two RF channels being transmitted in both directions through the repeater. The signals are then split at the output of the amplifier, filtered, and directed to the proper transmitting antenna.

The $F_1$ carrier is received at the west microwave parabolic dish antenna 20 and fed to circulator 22 using either coaxial cable or an appropriate waveguide run. The rotation of circulator 22 is such that $F_1$ is passed to bandpass filter 23, centered at the $F_1$ frequency, and then on to circulator 25. At this circulator, the $F_1$ carrier is directed to the microwave amplifier 26 wherein the signal is amplified. The typical gain required for most applications is in the 40 - 50 dB range, as will be discussed more fully later. At the output of amplifier 26, $F_1$ is directed through circulator 27 with the orientation as shown, and on to a second bandpass filter 29 having a passband centered at the $F_1$ frequency. Bandpass filter 29 rejects any unwanted signals outside the $F_1$ band, which would include the $F_2$ carrier, and also undesired intermodulation products. After passing through filter 29, the $F_1$ carrier is directed by circulator 30 to the east microwave antenna 21. At the same time, the $F_2$ carrier is received by microwave antenna 21 and fed through a feeder system consisting of either a coaxial run or a waveguide system to circulator 30. Due to this rotation of this circulator, $F_2$ is directed to bandpass filter 28 whose passband is centered at the $F_2$ frequency. After filtering, the $F_2$ carrier is passed through circulator 25 and on to bandpass filter 23. Since the bandpass filter 23 offers a nonterminating impedance to the $F_2$ band of frequencies, the $F_2$ carrier is reflected and directed back to circulator 25 and on to microwave 26. Since the amplifier is not into saturation, the $F_2$ carrier is amplified along with carrier $F_1$ by the same amount in microwave amplifier 26 and directed to circulator 27. Due to the orientation of circulator 27, the $F_2$ carrier is reflected off of filter 29 back through circulator 27 and to the bandpass filter whose passband is centered at the $F_2$ frequency and is transmitted by antenna 20.

The microwave amplifier used in the specific embodiment tested was a low-noise linear microwave transistor using discrete microstripline circuit design. The important characteristics of the amplifier are high gain over the frequencies of interest, high output power, low noise figure, good frequency response, high DC efficiency, minimum delay distortion, minimum AM/PM conversion, and reliable operation. It must also be capable of operating over a wide range of environmental conditions since the typical repeater site will be unattended and subject to wide temperature variation. The particular amplifier used in the specific embodiment tested had a maximum delay of 2 ns variation over 20 MHz, an available gain of + 50 dB, an output power capability (1 dB gain-compression point) of + 15 dBm in the 2 GHz and 4 GHz band and an AM/PM conversion of 1°/dB. Of secondary importance is nonlinear amplitude distortion in the amplifier since the RF carriers are frequency or phase modulated. Theory and measurement indicate that a very low amount of intermodulation distortion will be produced with only two RF angle-modulated signals in an amplifier operating near or into saturation and having a low value of AM/PM conversion. This is important since an upfade condition, which would cause the amplifier to go into saturation, must not cause noticeable distortion. The only result of an upfade condition should be a reduction in available gain in both directions. The preferable operating point of the amplifier should be at the 1 dB gain compression point, or at the edge of saturation, since it is at this point that the amplifier is operating at maximum efficiency. The actual amplifier used in the specific embdiment tested was manufactured by Varian Associates, Palo Alto, California, commercially available as part number VSL-7441. Since this amplifier had a small signal gain of 25 dB, two such amplifiers were used in series to obtain the requisite amplification. Certainly, there are other amplifiers commercially available having greater RF gain and output power which would operate equally well as the amplifier tested in the specific embodiment.

A possible variation of the single amplifier configuration would be to have two such amplifiers operate in parallel, with both input and output coupled together with a suitable impedance-matching device such as an RF hybrid. The advantage of this configuration would e that the maximum output level capability would be increased and a certain degree of system protection would be provided. However, the doubling of DC power consumption would probably outweigh the benefit derived from having two such amplifiers operate in parallel. This may not be true, however, in high channel systems where reliability is critical. The increased current drain may not be as important in every case as reliability.

Equally as important as the amplifier design is the proper choice of antenna. The standard parabolic antenna consists of a parabolic dish illuminated by a feed horn at the focus. These antennas are commercially available in most frequency bands with diameters of 2, 4, 6, 8, 10, and somtimes 12 feet. The standard parabolic dish antenna may be used in this system, providing certain precautions are taken to avoid side-to-side coupling from one antenna to the other at the same repeater location. Recently, metallic cylindrical build-out shields (called shrouds) have been attached to these standard parabolic dish antennas to reduce the far-field spurious radiation (side lobes). It has also been found that these high-performance shrouded parabolic antennas can also significantly improve the side-by-side coupling.

Shrouded antennas are normally fabricated using two-piece construction with the cylindrical shield being added to the dish antenna with rivets or similar devices.

It has now been found that the preferable construction technique is to have a single unit construction so that the leakage between the shroud and the dish reflector is eliminated. As one might expect, this improvement to the parabolic antenna not only reduces side-to-side coupling but also aids in directivity. This permits fuller dish illumination resulting in greater gain efficiency. Using this preferred type of construction on two 6 foot parabolic dish antennas, and using cross-polarization between the transmit and receive signals, the side-to-side isolation was measured, in the specific embodiment tested, to be better than 65 dB at 2 GHz, with a gain efficiency of about 60%. At 4 GHz, better than 85 dB isolation between similar antennas was obtained and better than 90 dB at 6 GHz.

The horn reflector antenna probably has sufficient performance characteristics to be used for certain duplex repeater applications. The horn antenna has high gain and provides sufficient side-by-side ratios to allow operation in two directions at the same frequency. The disadvantages of this antenna for this particular application are numerous. It is not commercially available in all frequency ranges (e.g., 2 GHz antennas are not made), and it is very large, heavy, and difficult to mount on a microwave tower. Not only is the antenna itself expensive, but the mounting and tower costs are also higher than the recommended parabolic antenna discussed earlier.

Since the transmitting and receiving signals are at the same frequency, very low antenna side-to-side coupling is a necessity for low distortion operation. The $L_3$ path shown in FIG. 2 illustrates the coupling path from the transmitting antenna to the receiving antenna. Any crosscoupling between these two antennas will introduce an echolike distortion having a long time delay. As has been predicted in the prior art, the antenna-to-antenna coupling produces the largest single source of intermodulation distortion in the repeater, and it is particularly damaging to high-quality performance. See "Echo Distortion in Frequency-Modulation" by R. G. Medhurst, in *Electronic and Radio Engineer*, July 1959, pp. 253 – 259. In general, the distortion magnitude is a complex function of the relative magnitude of the echo signal, the echo delay with respect to the main signal, the peak deviation, the width of the baseband, and the top modulating frequency. Specifically, Medhurst has shown for frequency division multiplex (FDM) systems that the maximum echo distortion in the top baseband channel is proportional to the fourth power of the echo delay and the square of the echo amplitude. The precautions suggested above should be exercised to the fullest extent possible to reduce the echo distortion for high-quality telecommunication operation, whether the baseband information is FDM channels, TV, or some other information.

Another possible source of echo distortion is the coupling between the amplifier input and output via the filters and circulators. This is shown in FIG. 2 by the two loop paths $L_1$ and $L_2$. The level of this echo can be made very small by proper filter design and by the optional use of the circulators as shown in FIG. 2.

The bandpass filters shown in FIG. 2 as 23, 24, 28, and 29 provide improved performance for duplex service in this application over the use of lowpass/highpass filters which have been used exclusively in CATV cable systems. The basic function of the bandpass filters, as explained earlier, is to properly channel the carrier signals from the receive antenna, through the amplifier, and on to the transmit antenna. The receive filters 23 and 28 also limit the amount of outside interference entering amplifier 26. Similarly, the transmit filters 24 and 29 attenuate the level of unwanted intermodulation products and higher-order harmonics, generated by the amplifier, that would otherwise be put out with the desired signals. The echo distortion introduced by feedback paths $L_1$ and $L_2$ can be reduced to acceptable levels by proper design of the bandpass filters. In $L_1$, the amount of attenuation to the $F_2$ band of frequencies is equal to the isolation of circulator 22 plus the out-of-band rejection of bandpass filter 23 less the gain of amplifier 26. The isolation of circulator 22 between ports 3 and 2 can be no better than the antenna match on port 1. In the 2 GHz frequency band, an antenna return loss of 20 to 25 dB is typical and therefore the isolation from port 3 to port 2 can be no better than this amount. With a maximum amplifier gain of 50 dB and assuming a circulator isolation of 20 dB, the out-of-band rejection of bandpass filter 23 should exceed 70 dB if acceptable toll quality noise requirements are to be maintained. A minimum rejection of 80 dB would imply a worst case echo in the $F_2$ band of 40 dB below the desired $F_2$ signal. In a radio system tested having a capacity of 36 FDM channels, the 60 dB echo produced negligible amounts of intermodulation (IM) noise. Of course, the IM noise depends not only on the echo amplitude but also the amount of echo delay — the longer the echo delay, the greater the IM noise.

The amount of attenuation to the $F_1$ band of frequencies in loop $L_1$ is greater than the $F_2$ isolation by the amount of isolation loss given by circulator 27. Specifically, the rejection in the $F_1$ band is the isolation of circulator 27, circulator 22, and out-of-band rejection of bandpass 24, less the gain of amplifier 26. Using the same rejection figures as before, the amount of echo in the $F_1$ band caused by loop $L_1$ would be over 60 dB below the desired signals. A similar analysis for loop $L_2$ produces a corresponding level of echo. Aside from echo considerations, the gain around the various loops ($L_1$, $L_2$ or $L_3$) must be less than 1 to prevent possible oscillation or instability.

If circulators are used as shown in FIG. 2, then care should be taken to properly match each port with a proper terminating impedance for optimum operation. For example, circulator 27 at port 2 must see a good termination looking into filter 29, otherwise a return signal will be conducted across circulator 27 and around loop $L_1$. For certain repeater applications, however, the use of circulators may not be necessary. If the bandpass filters are designed with adequate out-of-band rejection, then the added isolation provided by the circulators would not be required, and their use would be an unnecessary added expense.

There are two other related factors to consider in the design of the bandpass filters for this application: group delay (also called delay distortion) and filter return loss. As is well known in the art, delay distortion may be caused by the microwave path, the waveguide system, or the radio equipment itself. The end product is intermodulation distortion in the baseband. In the propagation path between antennas, delay distortion is caused by the reflected energy or multipath interference which reaches the receiving antenna but is delayed as compared to the direct signal. This is a path consideration, and there is nothing that can be done in the repeater equipment which will effect this type of delay distortion. Waveguide echoes are another source of delay distortion, and they result from impedance mismatches, i.e., poor return loss. To minimize this parameter, excessive waveguide lengths should be avoided and care should be taken in properly terminating the equipment. In FIG. 2, since the circulators 22 and 30 will reflect the impedance offered by the bandpass filters, the design of the filters must provide adequate return loss to minimize the delay distortion problem. For many applications, a return loss of 26 dB is minimum. Typically 30 to 40 dB is adequate.

Another source of delay distortion is in the bandpass filters themselves. If the filters have a nonlinear phase response, the transmission time through the filter will vary with frequency. This introduces a nonlinearity in the carrier signal which results in distortion. With high channel capacity systems, this is even more of a problem since higher capacity systems cannot tolerate as much group delay as narrow-band systems. Whereas a 36 channel system could probably tolerate as much as 10 nano-seconds (ns) across the RF band, a 600 channel system cannot tolerate much more than 2 ns across the 20 MHz band. Therefore, in higher channel capacity systems, a delay equalizer used in conjunction with each path may be a desirable modification to the configuration shown in FIG. 2. Such equalizers are well known in the art and should be placed in the $F_1$ path between filter 23 and circulator 25 and in the $F_2$ path between filter 28 and circulator 25. An equalizer here minimizes the distortion associated with phase distortion and with possible AM/PM conversion in the amplifier 26. Alternatively, the delay equalizers could be placed in the receive terminal equipment, but due to AM/PM conversion it is probably preferable to equalize this distortion at the repeater equipment where it occurs.

There are varied system considerations in applying the duplex repeater configuration illustrated in FIG. 2 to an actual microwave system. For example, in a 2 GHz system as illustrated in FIG. 1 with the following performance specifications, a fade margin of approximately 35 dB can be expected for a total terminal-to-terminal path length of up to 30 miles. (Terminal output power +30 dBm, receiver threshold −90 dBm, 6 foot antenna gain +30.4 dB, bandpass filter insertion loss 1 dB, and an available amplifier gain of 50 dB). Any greater distance and the fade margin will drop proportionately with the increase in path loss. One surprising result of this FIG. 1 configuration is that the repeater may be placed anywhere in the path with virtually no change of the system fade margin if the amplifier is always operated at its peak efficiency point, i.e., at the 1 dB gain compression point. This is certainly contrary to a microwave system using either a passive or typical active repeater. In the design of a microwave system using a passive repeater over the same terminal-to-terminal 30 mile distance, the optimum repeater location is not at the path midpoint. For a passive repeater, it is highly desirable to keep one of the paths very short since its effectiveness is an inverse function of the product of the length of the two paths, rather than the sum of their length. For the duplex repeater described herein, the optimum location is at the midpoint of the path since statistically the two equal path lengths will fade less than a very short length path and one very long length path. This unexpected result simplifies most path layout problems.

Occasionally a two-hop system cannot be configured for midpath operation, and one path must necessarily be longer than the other (e.g., one mile and 29 miles). An improvement can be made to the arrangement shown in FIG. 2 to improve system performance over the long-to-short path direction. Since the short-to-long signal will drive the repeater amplifier into saturation at some gain less than the full amount available, a reduction of this signal level into the amplifier will allow increased gain for the path in the opposite direction. Attenuating the strong signal to that of the weaker signal is preferably accomplished by using a fixed RF attenuator between bandpass filter 28 and circulator 30 (assuming that the $F_2$ path is the stronger signal).

In addition to the two-hop microwave path as shown in FIG. 1, the duplex repeater discussed herein may also be used in a multihop system. Due to the topography of a microwave path or for a variety of other reasons, it is frequently impossible to lay out a system using a single repeater. The duplex repeater configuration shown in FIG. 2 may be used as any other active repeater in a tandem repeater mode. When several duplex repeaters are used one after another, the duplex repeater spacing should be limited to a distance such that the free space attenuation between these duplex repeaters does not exceed the effective repeater gain, which of course would include the antenna gains. For example, in a 2 GHz system, using 6 foot parabolic dish antennas and an amplifier gain of 50 dB, the repeater spacings should be limited to distances less than 2.3 miles. Repeater spacings in excess of this amount will cause the path loss to exceed the repeater gain. The end result will be that the fade margin will be reduced to the point that eventually the signal cannot be recovered from the thermal noise. In other words, the radio receiver threshold will be reached and the system will be inoperable. In a 10 GHz tandem system, using the same 6 foot diameter parabolic dish antennas and an amplifier gain of 50 dB, the duplex repeater spacing should be limited to less than 11 miles between successive duplex repeaters of the type discussed herein.

Figure 3:
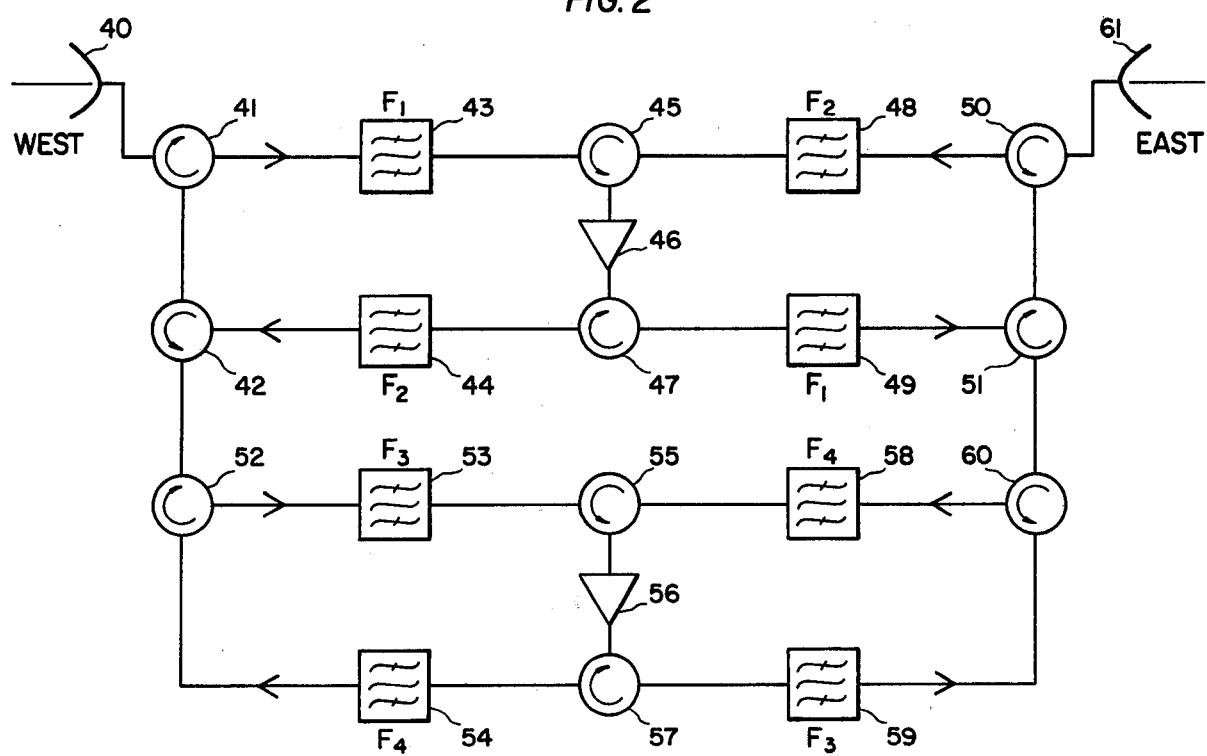
FIG. 3 is a block diagram illustrating a frequency diversity repeater in accordance with this invention.

FIG. 3 illustrates an application of the duplex repeater to a frequency diversity microwave system. Frequencies $F_1$ and $F_3$ are used to carry traffic in the west-to-east direction, and frequencies $F_2$ and $F_4$ are used to carry traffic in the east-to-west direction. This repeater configuration is basically composed of two complete duplex repeaters coupled together with circulators. Functionally, this configuration operates much the same as the basic duplex repeater. Carriers $F_1$ and $F_2$ are channeled through circulators 45 and 47 and through amplifier 46 via the bandpass filters 43, 48, 44, and 49. These bandpass filters operate in a similar fashion as those illustrated in FIG. 2. The diversity frequencies $F_3$ and $F_4$ have a somewhat longer path through the repeater than $F_1$ and $F_2$. Frequency $F_3$ enters the repeater via the west antenna 40 and is conducted through circulator 41 to bandpass filter 43. Since it is outside the transmission band of bandpass filter 43, the signal is reflected back to circulator 41 and then to circulator 42. Due to the rotation of circulator 42, the signal is conducted to circulator 52 and then finally to bandpass filter 53. Since bandpass filter 53 has a center frequency at $F_3$, the signal is allowed to pass through to circulator 55 and on to microwave amplifier 56. Once amplified, the signal is conducted through circulator 57 and through bandpass filter 59 where it again travels through three more circulators 60, 51, and 50 to eventually be retransmitted at the east antenna 61. The east-to-west path carrier $F_4$ is similarly conducted through the repeater and through amplifier 56 to be retransmitted at the west antenna 40.

As an obvious modification, the circulators could all be replaced with an electrical connection. Putting the bandpass filter directly together with no added isolation between them presents no serious problem if the out-of-band rejection of each is sufficient to keep the unwanted echo to an acceptable level.

It is to be understood that the above-described embodiments are only illustrative of the application of the principles of the present invention. Numerous other modifications and alternative arrangements may be devised by those skilled in the art without departing from the spirit and scope of the invention.

What is claimed is:

1. In an angle-modulated microwave radio system, a nonfrequency-converting microwave radio repeater providing duplex operation for angle-modulated carrier signals $F_1$ and $F_2$, where $F_1 \neq F_2$, and having nonoverlapping modulation bands $\Delta F_1$ and $\Delta F_2$, said repeater comprising:

first input terminal receiving said $F_1$ carrier and transmitting said $F_2$ signal;

second input terminal receiving said $F_2$ carrier and transmitting said $F_1$ carrier;

first circulator coupling means connected to said first input terminal;

second circulator coupling means connected to said second input terminal;

a first bandpass filter having a bandwidth of $\Delta F_1$ centered at $F_1$ and having an input and output, said input coupled to said first circulator coupling means;

a second bandpass filter having a bandwidth of $\Delta F_2$ centered at $F_2$ and having an input and output, said output coupled to said first circulator coupling means;

a third bandpass filter having a bandwidth of $\Delta F_1$ centered at $F_1$ and an input and output, said output coupled to said second circulator coupling means;

a fourth bandpass filter having a bandwidth of $\Delta F_2$ centered at $F_2$ and an input and output, said input coupled to said second circulator coupling means; and third circulator coupling means operatively connected to said first filter means output and to said first filter means output;

fourth circulator coupling means operatively connected to said second filter means input and to said third filter means input;

amplifier means having an input operatively connected to said third circulator coupling means and an output operatively connected to said fourth circulator coupling means, said amplifier means providing gain to at least the band of frequencies $\Delta F_1$ and $\Delta F_2$.

2. In an angle-modulated microwave radio system, a nonfrequency-converting microwave radio repeater providing duplex operation for angle-modulated carrier signals $F_1$ and $F_2$, where $F_1 \neq F_2$, and having nonoverlapping modulation bands $\Delta F_1$ and $\Delta F_2$, said repeater comprising:

first antenna means receiving said $F_1$ signal and transmitting said $F_2$ signal;

second antenna means receiving said $F_2$ carrier and transmitting said $F_1$ carrier;

first circulator coupling means connected to said fist antenna means;

second circulator coupling means connected to said second antenna means;

a first bandpass filter having a bandwidth of $\Delta F_1$ centered at $F_1$ and having an input and output, said input coupled to said first circulator coupling means;

a second bandpass filter having a bandwidth of of $\Delta F_2$ centered at $F_2$ and having an input and output, said output coupled to said first coupling circulator means;

a third bandpass filter having a bandwidth of $\Delta F_1$ centered at $F_1$ and an input and output, said output coupled to said second circulator coupling means;

a fourth bandpass filter having a bandwidth of $\Delta F_2$ centered at $F_2$ and an input and output, said input coupled to said second circulator coupling means; and third circulator coupling means operatively connected to said first filter means output and to said fourth filter means output;

fourth circulator coupling means operatively connected to said second filter means input and to said third filter means input;

amplifier means having an input operatively connected to said third circulator coupling means and an output operatively connected to said fourth circulator coupling means, said amplifier means providing gain to at least the band of frequencies $\Delta F_1$ and $\Delta F_2$.

3. A radio repeater as in claim 2 wherein each of said first, second, third, and fourth circulator coupling means further comprises a three-port microwave circulator.

4. A radio repeater as in claim 3 wherein said west antenna means further comprises a shrouded parabolic dish antenna having suppressed side lobes.

5. A radio repeater as in claim 4 wherein said east antenna means further comprises a shrouded parabolic dish antenna having suppressed side lobes.

6. A radio repeater as in claim 5 further comprising:

solar power generating means providing electrical power to said amplifier means; and energy-storage means connected to said amplifier means and capable of powering said amplifier means.

7. A radio repeater as in claim 2 wherein each of said first, second, third, and fourth circulator coupling means further comprises an electrical connection.

8. A radio repeater as in claim 3 further comprising a microwave attenuator coupled between said second circulator coupling means and said fourth bandpass filter means, for attenuating said $F_2$ carrier signal prior to amplification in said amplifier means.

9. In a frequency diversity angle-modulated radio system, a nonfrequency-converting radio repeater providing duplex operation for the west-to-east carrier signals $F_1$ and $F_3$, and for the east-to-west carrier signals $F_2$ and $F_4$, each modulated carrier signal, respectively, occupying the nonoverlapping modulation bands $\Delta F_1$, $\Delta F_3$, $\Delta F_2$ and $\Delta F_4$, said frequency diversity repeater comprising:

west antenna means receiving said $F_1$ and $F_3$ carrier signals and transmitting said $F_2$ and $F_4$ carrier signal;

east antenna means receiving said $F_2$ and $F_4$ carrier signals and transmitting said $F_1$ and $F_3$ carrier signals;

first circulator coupling means connected to said west antenna means;

second circulator coupling means connected to said east antenna means;

third circulator coupling means connected to said first circulator coupling means;

fourth circulator coupling means connected to said second circulator coupling means;

fifth circulator coupling means connected to said third circulator coupling means;

sixth circulator coupling means connected to said fourth circulator coupling means;

a first bandpass filter having a bandwidth of $\Delta F_1$ centered at $F_1$ and having an input and output, said input coupled to said first circulator coupling means;

a second bandpass filter having a bandwidth of $\Delta F_2$ centered at $F_2$ and having an input and output, said input connected to said second circulator coupling means;

a third bandpass filter having a bandwidth of $\Delta F_2$ centered at $F_2$ and having an input and output, said output connected to said third circulator coupling means;

a fourth bandpass filter having a bandwidth of $\Delta F_1$ centered at $F_1$ and having an input and output, said output connected to said fourth circulator coupling means;

a fifth bandpass filter having a bandwidth of $\Delta F_3$ centered at $F_3$ and having an input and output, said input connected to said fifth circulator coupling means;

a sixth bandpass filter having a bandwidth of $\Delta F_4$ centered at $F_4$ and having an input and output, said input connected to said sixth circulator coupling means;

a seventh bandpass filter having a bandwidth of $\Delta F_4$ centered at $F_4$ and having an input and output, said output connected to said fifth circulator coupling means;

a eighth bandpass filter having a bandwidth of $\Delta F_3$ centered at $F_3$ and having an input and output, said output connected to said sixth circulator coupling means;

seventh circulator coupling means connected to said first bandpass filter means output and to said second bandpass filter means output;

eighth circulator coupling means connected to said third bandpass filter means input and to said fourth bandpass filter means input;

first amplifier means having an input operatively connected to said seventh circulator coupling means and an output operatively connected to said eighth circulator coupling means, said amplifier means providing gain to at least the band of frequencies $\Delta F_1$ and $\Delta F_2$;

ninth circulator coupling means connected to said fifth bandpass filer means output and to said sixth bandpass filter means output;

tenth circulator coupling means connected to said seventh bandpass filter means input and said eighth bandpass filter means input; and second amplifier means having an input operatively connected to said ninth circulator coupling means and an output operatively connected to said tenth circulator coupling means, said amplifier means providing gain to at least the band of frequencies $\Delta F_3$ and $\Delta F_4$.

10. A frequency diversity radio repeater as in claim 9 wherein each of said first, second, third, fourth, fifth, and sixth circulator coupling means comprises a three-port microwave circulator.

11. A frequency diversity radio repeater as in claim 10 wherein each of said seventh, eighth, ninth, and tenth circulator coupling means comprises a three-port microwave circulator.

12. A frequency diversity radio repeater as in claim 11 wherein said east antenna means further comprises a shrouded parabolic dish antenna having suppressed side lobes.

13. A frequency diversity radio repeater as in claim 12 wherein said west antenna means further comprises a shrouded parabolic dish antenna having suppressed side lobes.

14. A repeater system as in claim 6 further including means for providing an external DC voltage to said amplifier means.

15. A microwave repeater as in claim 14 wherein said voltage means further comprises:

solar cells operatively connected to said amplifier means and having sufficient power capacity to drive amplifier means; and primary cells operatively connected to said amplifier means and providing a standby source of electrical power to said amplifier means during periods when said solar cells are inoperative.

* * * * *